(12) United States Patent
Wang

(10) Patent No.: US 12,325,386 B2
(45) Date of Patent: Jun. 10, 2025

(54) BATTERY SWAPPING PLATFORM AND BATTERY SWAPPING STATION

(71) Applicant: CONTEMPORARY AMPEREX TECHNOLOGY (HONG KONG) LIMITED, Hong Kong (CN)

(72) Inventor: Xia Wang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 336 days.

(21) Appl. No.: 18/119,361

(22) Filed: Mar. 9, 2023

(65) Prior Publication Data
US 2023/0219539 A1    Jul. 13, 2023

Related U.S. Application Data

(63) Continuation of application No. PCT/CN2021/115123, filed on Aug. 27, 2021.

(51) Int. Cl.
*B60S 5/06*    (2019.01)

(52) U.S. Cl.
CPC ..................... *B60S 5/06* (2013.01)

(58) Field of Classification Search
CPC ........................................................ B60S 5/06
See application file for complete search history.

(56) References Cited

U.S. PATENT DOCUMENTS

| | | | |
|---|---|---|---|
| 9,650,022 B2 | 5/2017 | Yang et al. | |
| D898,788 S | * 10/2020 | Bengtsson | ................... D15/199 |
| D921,732 S | * 6/2021 | Bengtsson | ................... D15/199 |
| 12,017,622 B1 | * 6/2024 | Mireles | ............... H01M 50/244 |

(Continued)

FOREIGN PATENT DOCUMENTS

| | | |
|---|---|---|
| CN | 102328636 A | 1/2012 |
| CN | 102700513 A | 10/2012 |

(Continued)

OTHER PUBLICATIONS

International Search Report and Written Opinion mailed on Jan. 28, 2022, received for PCT Application PCT/CN2021/115123, filed on Aug. 27, 2021, 18 pages including English Translation.

(Continued)

*Primary Examiner* — Erez Gurari
(74) *Attorney, Agent, or Firm* — XSENSUS LLP

(57) ABSTRACT

Embodiments of the present application provide a battery swapping platform and a battery swapping station. The battery swapping platform may comprise: a guide rail extending along a first direction and used for moving a mobile battery swapping apparatus along the first direction, wherein the guide rail may comprise a first guide rail segment and a second guide rail segment; a first platform that may be rotatable and used for fixing the first guide rail segment; a second platform that may be used for fixing the second guide rail segment, may be provided on the first platform, and rotatable with the first platform; and a translation drive assembly for driving the second platform to move along a second direction perpendicular to the first direction relative to the first platform, so as to move the mobile battery swapping apparatus along the second direction.

15 Claims, 8 Drawing Sheets

(56) References Cited

U.S. PATENT DOCUMENTS

| | | | |
|---|---|---|---|
| 2010/0145717 A1* | 6/2010 | Hoeltzel | B60K 1/04 |
| | | | 320/109 |
| 2015/0151723 A1 | 6/2015 | Yang et al. | |
| 2015/0307068 A1* | 10/2015 | Gaffoglio | B60L 50/60 |
| | | | 414/809 |
| 2018/0134260 A1* | 5/2018 | Ahrens | B60S 5/06 |
| 2020/0017342 A1* | 1/2020 | Bengtsson | B60K 1/04 |
| 2020/0331358 A1* | 10/2020 | Lee | B60K 1/04 |
| 2020/0353838 A1* | 11/2020 | Zhang | B60L 53/35 |
| 2020/0385252 A1* | 12/2020 | Zhang | B23P 19/10 |
| 2021/0261017 A1* | 8/2021 | Uiterloo | B60L 50/66 |
| 2023/0219539 A1* | 7/2023 | Wang | B60S 5/06 |
| | | | 180/54.1 |
| 2023/0234234 A1* | 7/2023 | Zhang | B60L 53/80 |
| | | | 700/259 |
| 2023/0234540 A1* | 7/2023 | Chen | B60L 58/18 |
| 2023/0242001 A1* | 8/2023 | Li | B60L 53/80 |
| | | | 180/68.5 |
| 2023/0242002 A1* | 8/2023 | Li | B60L 50/66 |
| | | | 180/68.5 |
| 2023/0278455 A1* | 9/2023 | Saliga | B60L 53/65 |
| | | | 320/109 |
| 2024/0253516 A1* | 8/2024 | Iwaasa | B60S 5/06 |
| 2024/0336460 A1* | 10/2024 | Lee | B66F 7/28 |
| 2025/0026318 A1* | 1/2025 | Anapolsky | B60L 50/66 |
| 2025/0030104 A1* | 1/2025 | Chen | B60S 5/06 |

FOREIGN PATENT DOCUMENTS

| | | |
|---|---|---|
| CN | 206086672 U | 4/2017 |
| CN | 207481873 U | 6/2018 |
| CN | 108313027 A | 7/2018 |
| CN | 208855603 U | 5/2019 |
| CN | 112693355 A | 4/2021 |
| CN | 113212238 A | 8/2021 |
| WO | 2020/174306 A1 | 9/2020 |

OTHER PUBLICATIONS

Extended European Search Report issued Jan. 3, 2024 in European Patent Application No. 21954622.3.

\* cited by examiner

BATTERY SWAPPING PLATFORM AND BATTERY SWAPPING STATION

CROSS-REFERENCE TO RELATED APPLICATION

The present application is a continuation of International Application No. PCT/CN2021/115123, filed Aug. 27, 2021, which is incorporated herein by reference in its entirety.

TECHNICAL FIELD

The present application relates to the field of battery swapping stations and, in particular, to a battery swapping platform and a battery swapping station.

BACKGROUND ART

A vehicle can swap its battery at a battery swapping station. The battery swapping station may be configured with a battery swapping platform, and a mobile battery swapping apparatus, such as a rail guided vehicle (RGV) capable of battery swapping. When the vehicle is located on the battery swapping platform, the mobile battery swapping apparatus can transport a battery to the vehicle. The mobile battery swapping apparatus can take out a battery from the vehicle and mounts a to-be-mounted battery in the battery compartment of the vehicle. For various types of vehicles, it is difficult for the mobile battery swapping apparatus to mount batteries on the vehicles with relative precision.

SUMMARY OF THE INVENTION

The present application provides a battery swapping platform and a battery swapping station for the purpose of facilitating the mounting of a battery on a vehicle by a mobile battery swapping apparatus with relative precision.

In a first aspect, a battery swapping platform is provided, comprising: a guide rail extending along a first direction, wherein the guide rail is used for moving a mobile battery swapping apparatus along the first direction, the mobile battery swapping apparatus being used for swapping a battery for a vehicle, and the guide rail comprises a first guide rail segment and a second guide rail segment; a first platform for fixing the first guide rail segment, wherein the first platform is rotatable; a second platform for fixing the second guide rail segment, wherein the second platform is provided on the first platform and is rotatable with the first platform; and a translation drive assembly for driving the second platform to move along a second direction relative to the first platform, so as to move the mobile battery swapping apparatus along the second direction, wherein the second direction is perpendicular to the first direction.

In the solution provided in the present application, by rotating the first platform to drive the second platform to rotate, and by driving the second platform to move in a direction perpendicular to the guide rail relative to the first platform, it is made possible that when the mobile battery swapping apparatus travels to the second guide rail segment on the second platform, the mobile battery swapping apparatus can move along the second guide rail segment and can move in a direction perpendicular to the second guide rail segment, and the mobile battery swapping apparatus can also rotate following the second platform. With the battery swapping platform provided in the present application, the mobile battery swapping apparatus can move along multiple directions, and the positions in which the mobile battery swapping apparatus can stay on the battery swapping platform can be more diverse, so that the mobile battery swapping apparatus can more easily adapt to multiple battery compartment positions. Therefore, the solution provided in the present application is conducive to improving the accuracy of mounting batteries by the mobile battery swapping apparatus.

In a possible implementation, the second platform is contained in the first platform, and the first platform is provided with an open window, the open window being used for exposing the second platform. Through the first platform with the open window, the mobile battery swapping apparatus can move along the guide rail on the second platform and the second platform and other components connected to the second platform can be subjected to mechanical protection by the first platform.

In a possible implementation, there is a broken seam between the first guide rail segment and the second guide rail segment, wherein the broken seam corresponds to an edge of the open window to allow the second guide rail segment and the second platform to move along the second direction. Since the broken seam corresponds to the edge of the open window, when the mobile battery swapping apparatus travels to the second platform, in addition to moving along the guide rail, the mobile battery swapping apparatus can also move perpendicular to the guide rail, which is conducive to increasing the space in which the mobile battery swapping apparatus can move along and perpendicular to the guide rail.

In a possible implementation, the movement space for the second guide rail segment in the second direction is within the open window. The open window can be used to limit the position of the guide rail, which is conducive to reducing the risk of the guide rail detaching from the first platform.

In a possible implementation, the battery swapping platform further comprises: a rack extending along the first direction, wherein the rack comprises a first rack segment and a second rack segment, the first rack segment being fixed to the first platform and the second rack segment being fixed to the second platform. A gear that is engaged with the rack can be provided on the mobile battery swapping apparatus. When the mobile battery swapping apparatus moves to the first platform, the gear of the mobile battery swapping apparatus can be fitted with the first rack segment. When the mobile battery swapping apparatus move to the second platform, the gear of the mobile battery swapping apparatus can be fitted with the second rack segment. By driving the second platform to move relative to the first platform, the second rack segment can move following the second platform and the mobile battery swapping apparatus can still be engaged with the rack, thus facilitating flexible switching between a mode in which the mobile power changing device moves along the guide rail and a mode in which the mobile battery swapping apparatus moves perpendicular to the guide rail.

In a possible implementation, the translation drive assembly comprises a first fixing member, wherein the first fixing member is fixedly connected to the second platform, and the first fixing member is configured to move along the second direction so as to drive the mobile battery swapping apparatus to move along the second direction. The translation drive assembly can enable movement of the second guide rail segment by controlling the displacement of the first fixing member, which is conducive to improving the convenience of moving the second guide rail segment.

In a possible implementation, the second platform is provided with a clamping slot, and the first fixing member is a boss fitted with the clamping slot. The fitting relationship between the clamping slot and the boss allows the translation drive assembly to drive the second platform to move relative to the first platform, and the fixed connection relationship between the second platform and the translation drive assembly is relatively easy to be contacted, thus facilitating the removal of the second platform for the inspection and maintenance of components inside the battery swapping platform.

In a possible implementation, the translation drive assembly further comprises a lead screw, a transmission nut, and a first motor, wherein the lead screw extends along the second direction, and the transmission nut is in transmission fit with the lead screw; and the transmission nut is connected to the first fixing member, and the first motor is used for driving the lead screw to rotate so as to drive the transmission nut to move relative to the lead screw. The number of revolutions of the lead screw can correspond relatively precisely to the displacement of the transmission nut, which is conducive to improving the accuracy of the displacement of the mobile battery swapping apparatus perpendicular to the guide rail.

In a possible implementation, a rail extending along the second direction is fixed on the first platform, and the second platform is configured to move on the rail. The rail can limit the movement of the second platform, which facilitates the reduction of the offset in the direction of movement of the second platform and in the direction perpendicular to the rail, which in turn is conducive to improving the accuracy of the displacement of the mobile battery swapping apparatus on the battery swapping platform.

In a possible implementation, the battery swapping platform further comprises: a rotation drive assembly, wherein the rotation drive assembly is used for driving the first platform and the second platform to rotate as a whole. The rotation drive assembly can drive the first platform to rotate by a specified angle, which is conducive to improving the accuracy of rotation of the mobile battery swapping apparatus on the battery swapping platform.

In a possible implementation, the second platform is provided in a central area of the first platform, and the rotation drive assembly is used for driving the first platform and the second platform to rotate around the center of the first platform. After the first platform and the second platform rotate as a whole, the mobile battery swapping apparatus can be relatively close to the center of the first platform, which is conducive to reducing the displacement of the mobile battery swapping apparatus relative to the battery swapping platform as a whole after the rotation and conducive to improving the efficiency of moving the mobile battery swapping apparatus on the battery swapping platform.

In a possible implementation, the rotation drive assembly comprises a second fixing member, wherein the second fixing member is used for fixedly connecting the first platform, and the second fixing member is driven to rotate so as to drive the first platform and the second platform to rotate as a whole. The rotation drive assembly can enable rotation of the first platform and the second platform by controlling the rotation of the second fixing member, which is conducive to improving the convenience of rotating the second guide rail segment.

In a possible implementation, the second fixing member is a first gear, and the rotation drive assembly further comprises a second gear and a second motor, wherein the first gear is engaged with the second gear, and the second motor is used for driving the second gear to rotate so as to drive the first gear to rotate. The number of revolutions of the second gear can correspond relatively precisely to the rotation angle of the first gear, which is conducive to improving the accuracy of rotation of the mobile battery swapping apparatus.

In a possible implementation, the first gear is a gear ring surrounding the translation drive assembly, and the translation drive assembly is used for moving the second platform within an area enclosed by the first gear. The translation drive assembly is housed within the area enclosed by the first gear, which is conducive to reducing the overall space required by the battery swapping platform to house the translation drive assembly and the rotation drive assembly.

In a second aspect, a battery swapping station is provided, comprising: a battery rack, a mobile battery swapping apparatus, and a battery swapping platform as described in the first aspect above or in any possible implementation of the first aspect, wherein the battery rack is configured with a plurality of batteries, and the mobile battery swapping apparatus is used to transport a battery on the battery rack to the battery swapping platform, and move on the battery swapping platform along the first direction and/or the second direction so as to swap the battery to the vehicle.

In the battery swapping platform and battery swapping station provided in the present application, a first guide rail segment of the guide rail can be fixed to a rotatable first platform, a second guide rail segment of the guide rail can be fixed to a second platform, the second platform is rotatable with the first platform, and a translation drive assembly can be used for driving the second platform to move along a direction perpendicular to the guide rail relative to the first platform, so that the mobile battery swapping apparatus can rotate on the battery swapping platform, translate along the guide rail, and translate perpendicular to the guide rail. Thus, the positions in which the mobile battery swapping apparatus can stay on the battery swapping platform can be more diverse, so that the mobile battery swapping apparatus can more easily adapt to multiple battery compartment positions. Therefore, the solution provided in the present application is conducive to improving the accuracy of mounting batteries by the mobile battery swapping apparatus.

DESCRIPTION OF DRAWINGS

In order to illustrate the technical solutions of the embodiments of the present application more clearly, the following briefly introduces the drawings required in the embodiments of the present application. Obviously, the drawings described below are only some embodiments of the present application. For those of ordinary skill in the art, other drawings may also be obtained according to the drawings without any creative effort.

Figure 1:
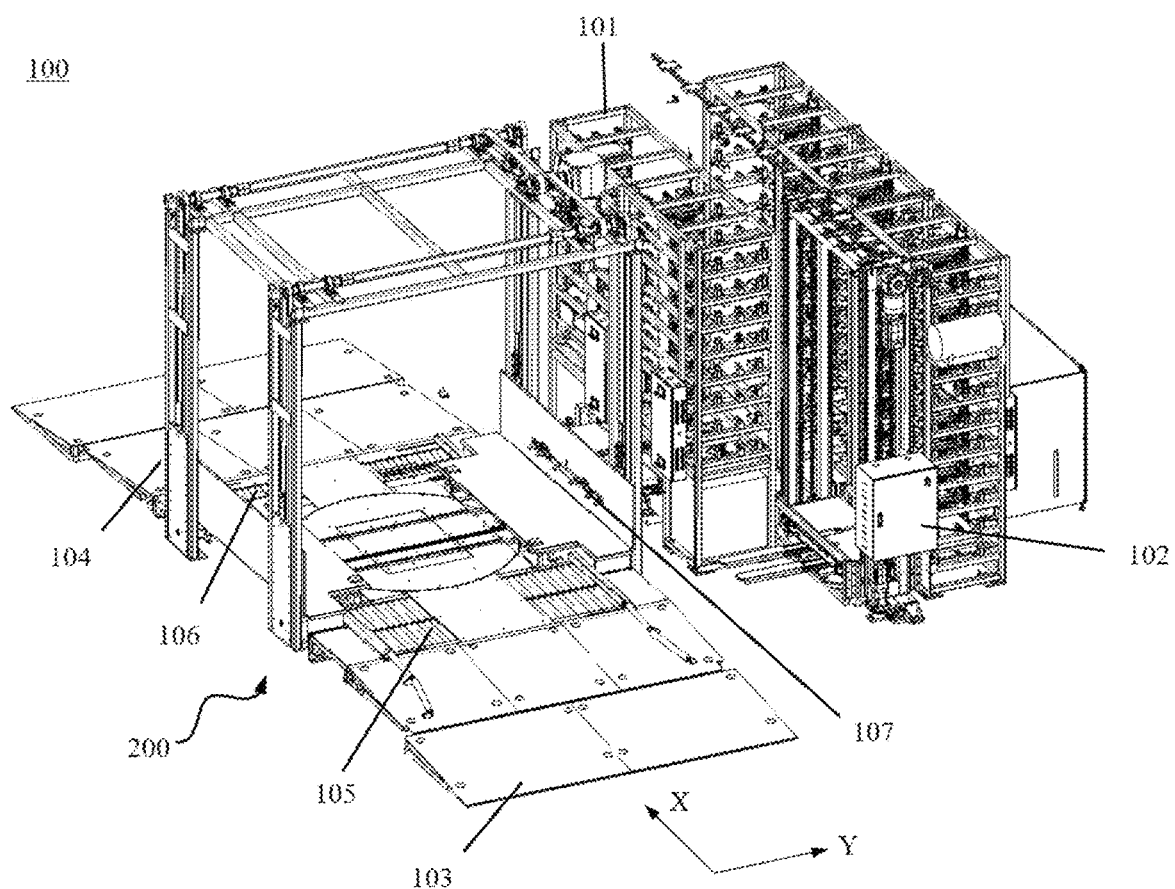
FIG. 1 is a schematic structural diagram of a battery swapping station as disclosed in an embodiment of the present application.

In the accompanying drawings, the accompanying drawings are not drawn to actual scale.

DETAILED DESCRIPTION

The embodiments of the present application need to be further described in detail below with reference to the accompanying drawings and embodiments. The following detailed description of the embodiments and the accompanying drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are used for descriptive purposes only, and cannot be construed as indicating or implying relative importance. "Vertical" does not mean being vertical in the strict sense, but within the allowable range of error. "Parallel" does not mean being parallel in the strict sense, but within the allowable range of error.

Orientation words appearing in the following description are all directions shown in the drawings, and do not limit the specific structure of the present application. In the description of the present application, it should also be noted that, unless otherwise expressly specified and limited, the terms "mount," "connected," and "connecting" should be broadly understood, for example, they may be a fixed connection or a detachable connection or be an integrated connection; or may be a direct connection or an indirect connection through an intermediate medium. For those of ordinary skill in the art, the specific meanings of the above terms in the present application may be understood according to specific circumstances.

In the present application, the battery cell may include the lithium-ion secondary battery, the lithium-ion primary battery, the lithium-sulfur battery, the sodium/lithium ion battery, the sodium-ion battery or the magnesium-ion battery, and the like, which is not limited in the embodiments of the present application. The battery cell may be cylindrical, flat, rectangular, or in other shapes, which is also not limited in the embodiments of the present application. The battery cells are generally divided into three types according to packaging manners: cylindrical battery cells, rectangular battery cells, and pouch cells, which are not limited in the embodiments of the present application.

The battery referred to in the embodiments of the present application is a single physical module that includes one or more battery cells to provide a higher voltage and capacity.

For example, the battery referred to in the present application may include a battery pack. The battery generally includes a box body for encapsulating one or more battery cells. The box body prevents liquids or other foreign matters from affecting the charging or discharging of battery cells.

To meet different power needs, the battery may include a plurality of battery cells, wherein the plurality of battery cells may be connected to each other in a series connection or a parallel connection or a parallel-series connection which is a mixture of series and parallel connections. Optionally, the plurality of battery cells may first be connected in a series connection or a parallel connection or a parallel-series connection to form battery modules, and a plurality of battery modules may then be connected in a series connection or a parallel connection or a parallel-series connection to form a battery. In other words, the plurality of battery cells can directly form a battery, or can first form battery modules, and the battery modules then form a battery. The battery is then further set in electrical equipment to provide electricity for the electrical equipment.

The electrical equipment mentioned in the embodiments of the present application may refer to a vehicle, such as an electric battery car, an electric vehicle, etc. The electrical equipment referred to in the embodiments of the present application may also be other apparatuses that use batteries, such as mobile phones, portable devices, laptops, electric toys, electric tools, ships, and spacecrafts. The spacecrafts include, for example, aircraft, rockets, space shuttles, and spaceships.

It should be understood that the technical solutions described in the embodiments of the present application are not limited to the devices described above, but can be applied to all devices that use batteries, but for the sake of concise description, the following embodiments are illustrated with a vehicle as an example.

FIG. 1 is a schematic structural diagram of a battery swapping station 100 provided in an embodiment of the present application.

The battery swapping station 100 may include a battery rack 101. The battery rack 101 may be configured with a plurality of batteries. The battery rack 101 may include a battery charging compartment and a battery caching apparatus. A battery may be stored in the battery charging compartment to allow the battery to be charged. The battery rack 101 may be configured with a battery caching apparatus. The battery caching apparatus may be used for placing a to-be-stored or to-be-charged battery in the battery charging compartment, and also to take out a battery for which charging has been completed or a to-be-taken out battery from the battery charging compartment.

In an embodiment, the battery rack 101 may further include a fire protection transmission apparatus, which may be used for maintaining the fire safety of the battery swapping station 100.

The battery swapping station 100 may also include a palletizer 102 and a mobile battery swapping apparatus (not shown in FIG. 1). The palletizer 102 may be used for transporting the battery swapped by the mobile battery swapping apparatus from the vehicle 1 to the battery caching apparatus. The battery caching apparatus may place the to-be-charged battery in an empty battery charging compartment to charge the to-be-charged battery. The palletizer 102 may also be used for taking out a to-be-mounted battery on the battery caching apparatus and for moving that to-be-mounted battery to a docking position of the mobile battery swapping apparatus. The mobile battery swapping apparatus may be used for taking out the to-be-mounted battery from the palletizer 102 and transporting the to-be-mounted battery to the vicinity of the vehicle 1. The mobile battery swapping apparatus may also transport the battery taken out from the vehicle 1 to the palletizer 102.

Figure 2:
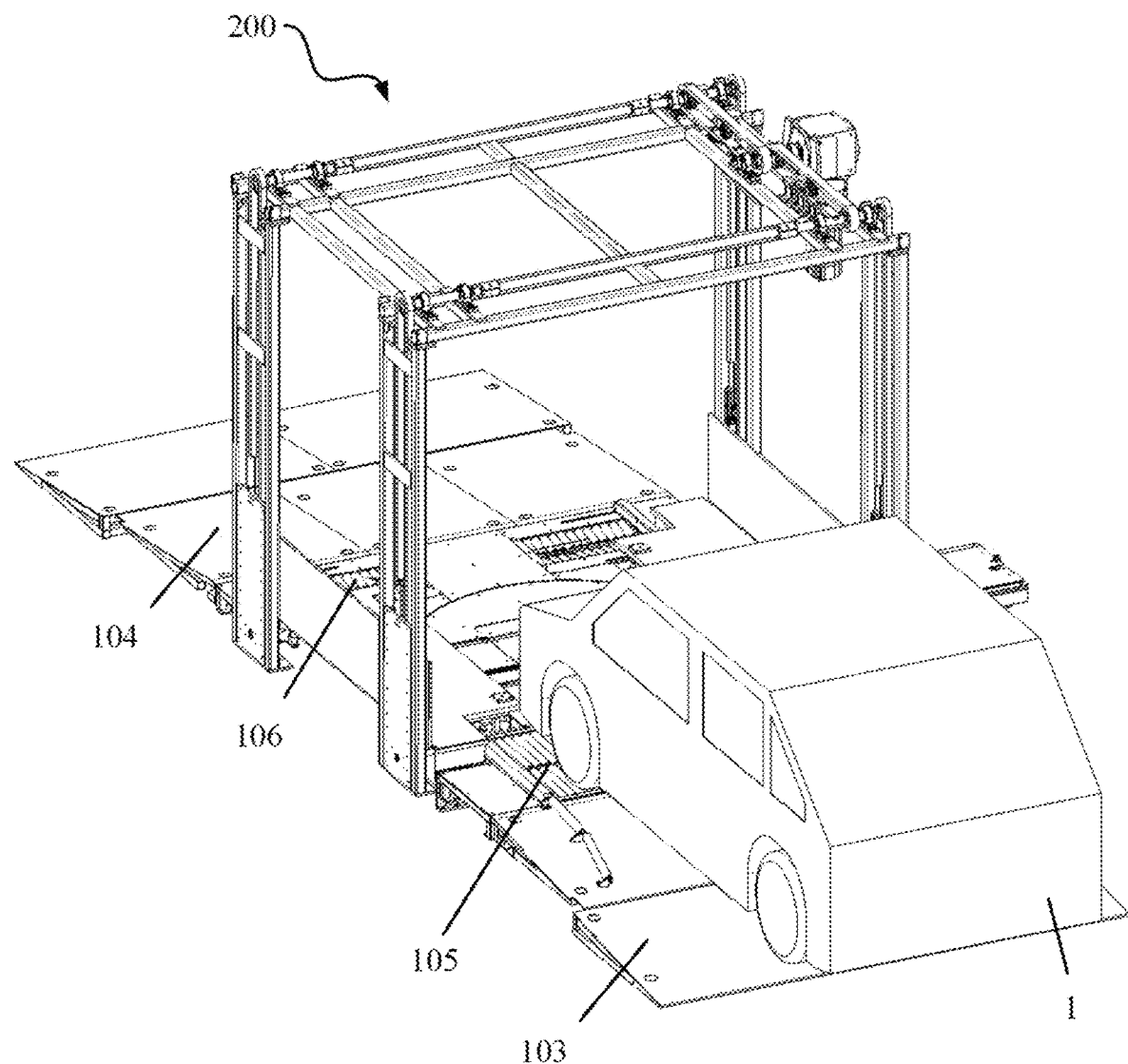
FIG. 2 is a schematic structural diagram of a battery swapping platform as disclosed in an embodiment of the present application.

The battery swapping station 100 may also include a battery swapping platform 200. FIG. 2 illustrates a schematic diagram of the traveling of vehicle 1 on the battery swapping platform 200. On the battery swapping platform 200, the mobile battery swapping apparatus can swap the battery on the vehicle 1. The X direction in FIG. 1 may be the direction of travel of the vehicle 1 on the battery swapping platform 200. The Y direction in FIG. 1 may be the direction of travel of the mobile battery swapping apparatus on the battery swapping platform 200. The mobile battery swapping apparatus may move to the vicinity of the vehicle 1 in the Y direction through the guide rail on the battery swapping platform 200. The vehicle 1 can swap the battery on the battery swapping platform 200 through the mobile battery swapping apparatus. The mobile battery swapping apparatus may be used to transport a battery on the battery rack 101 to the battery swapping platform 200. The mobile battery swapping apparatus can travel on the battery swapping platform 200 and move to a location corresponding to the battery compartment 20 of the vehicle 1 to take out the to-be-charged battery in the battery compartment 20 and mount the to-be-mounted battery into the battery compartment 20 so that the battery can be swapped to the vehicle 1. The mobile battery swapping apparatus may for example be an RGV.

In an embodiment, the mobile battery swapping apparatus may include a disassembly mechanism and a lifting mechanism. When the mobile battery swapping apparatus is aligned with the battery in the battery compartment 20 of the vehicle 1, the lifting mechanism may be used to lift the disassembly mechanism. The disassembly mechanism can disassemble the battery in the battery compartment 20 so that the battery in the battery compartment 20 can be dropped into the mobile battery swapping apparatus. When the mobile battery swapping apparatus moves to the battery caching apparatus, the lifting mechanism can place the battery carried by the mobile battery swapping apparatus on the battery caching apparatus by lifting the battery. After the mobile battery swapping apparatus carries the to-be-mounted battery and travels to a position aligned with the battery compartment 20, the lifting mechanism can be used to lift the to-be-mounted battery to load the to-be-mounted battery into the battery compartment 20.

In the embodiments shown in FIGS. 1 and 2, the battery swapping platform 200 may also include a vehicle lifting mechanism 107, a front ramp 104, a front wheel alignment roller 106, a rear ramp 103, and a rear wheel alignment roller 105. The vehicle 1 may travel from the rear ramp 103 toward the front ramp 104 as shown in FIG. 2. Along the direction of travel of the vehicle 1, the front wheel alignment roller 106 and the rear wheel alignment roller 105 may be located between the front ramp 104 and the rear ramp 103. The front wheel alignment roller 106 may be provided close to the front ramp 104 and the rear wheel alignment roller 105 may be provided close to the rear ramp 103. The front wheel alignment roller 106 may be used to position the front wheels of the vehicle 1. The rear wheel alignment roller 105 may be used to position the rear wheels of the vehicle 1. The battery swapping platform 200, through the front wheel alignment roller 106 and the rear wheel alignment roller 105, can position the vehicle 1 in the X direction and the Y direction so that the vehicle 1 can be fixed relative to the battery swapping platform 200. When the battery swapping platform 200 has finished positioning the vehicle 1, the vehicle lifting mechanism 107 may be triggered to lift the vehicle 1. The positioning of the battery swapping vehicle 1 and the lifting of the vehicle 1 for which battery swapping is performed may be preparatory steps in the battery swapping process. After the vehicle 1 has completed the battery swapping, the vehicle lifting mechanism 107 can lower the vehicle 1 back to the battery swapping platform 200.

Figure 3:
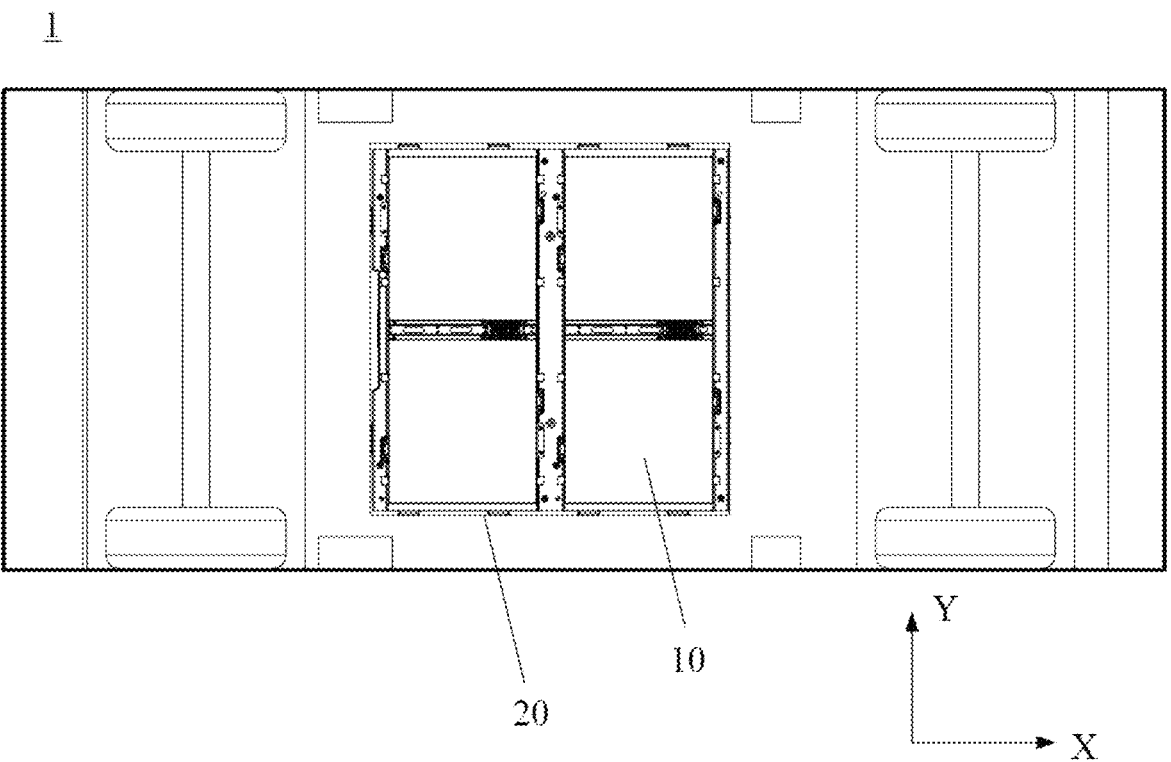
FIG. 3 is a schematic structural diagram of a vehicle as disclosed in an embodiment of the present application.

FIG. 3 illustrates, in an embodiment, a schematic structural diagram of the battery compartment 20 as viewed from the bottom of the vehicle 1.

The vehicle 1 may be a fuel vehicle, a gas vehicle or a new energy vehicle, and the new energy vehicle may be an all-electric vehicle, a hybrid vehicle or an extended range electric vehicle, etc. The interior of the vehicle 1 can be provided with a motor, a controller, and a battery 10, and the controller is used for controlling the battery 10 to power the motor. In some embodiments, as shown in FIG. 3, the battery 10 may be provided at the bottom of the vehicle 1. In some other embodiments, the battery 10 may be provided at the front or rear of the vehicle. The battery 10 may be used for powering the vehicle 1, for example, the battery 10 may be used as an operating power supply of the vehicle 1, and used in the circuit system of the vehicle 1, for example, for the work electricity demand during the start-up, navigation and operation of the vehicle 1. In another embodiment of the present application, the battery 10 can serve not only as an operating power supply for the vehicle 1, but also as a driving power supply for the vehicle 1, so as to replace or partially replace fuel or natural gas to provide driving power for the vehicle 1.

For vehicle 1 of different models, due to constraints of the mechanical structure, the shape and size of the battery compartment 20 may vary. To adapt to different vehicle models, the battery 10 may be in a split pack mode, which means that the battery 10 may have a smaller size. For example, the volume of the battery 10 may be approximated as 1/N of the volume of the battery compartment 20, where N may be a different positive integer value for different vehicle models. In this way, for different vehicle models, N corresponding batteries 10 can be used, which makes it possible to adapt the batteries 10 to different vehicle models. At the same time, due to the reduced size of the battery 10, the space occupied by the battery swapping station 100 may also be reduced, which can reduce the occupied space of the battery swapping station 100 and reduce the cost of the battery swapping station 100.

For example, the volume of the battery 10 can be half of the volume of the battery compartment 20 as shown in FIG. 3. In this way, the battery compartment 20 shown in FIG. 3 can accommodate two batteries 10. For a battery compartment that is only half the volume of the battery compartment 20 as shown in FIG. 3, one battery 10 can be accommodated. For a larger battery compartment, more batteries 10 can be accommodated.

Figure 4:
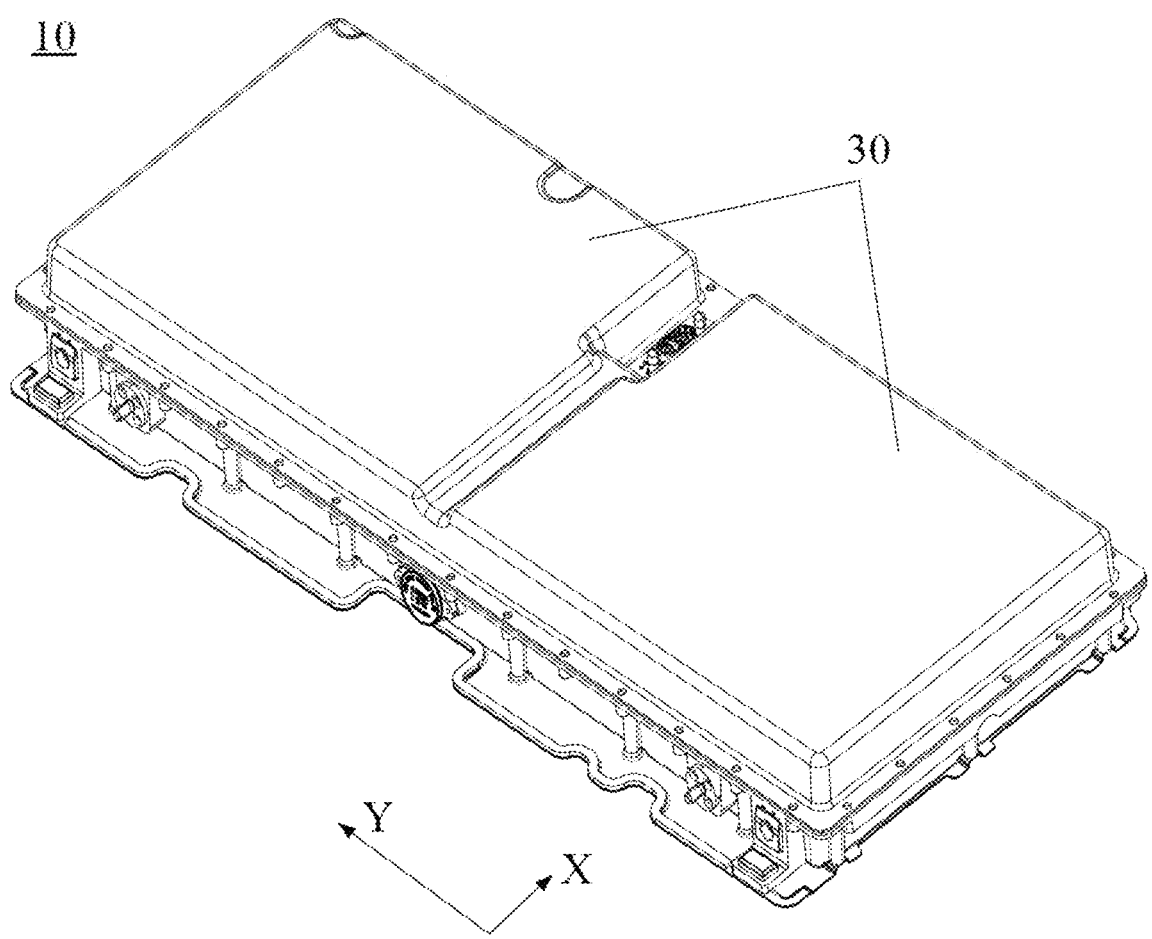
FIG. 4 is a schematic structural diagram of a battery as disclosed in an embodiment of the present application.

FIG. 4 illustrates a schematic structural diagram of a battery 10 provided in an embodiment of the present application. To meet different power usage needs, the battery 10 may include a plurality of battery cells. The battery 10 may also include a box body, wherein the box body has a hollow structure inside, and a plurality of battery cells are accommodated inside the box body. For example, the plurality of battery cells are connected in a parallel connection or a series connection or a parallel-series connection with each other and placed inside the box body.

Optionally, the battery 10 may also include other structures, which will not be repeated here. For example, the battery 10 may further include a current collection component for realizing the electrical connection between the plurality of battery cells, such as a series connection or a parallel connection or a parallel-series connection. Specifically, the current collection component can realize the electrical connection between the battery cells by connecting the electrode terminals of the battery cells. Further, the current collection component may be fixed to the electrode terminals of the battery cells by means of welding. The electrical energy of the plurality of battery cells may further be drawn through the box body by means of a conductive mechanism. Optionally, the conductive mechanism may also be a current collection component.

The number of battery cells can be set to any value depending on the power demand. The plurality of battery cells may be connected in a series connection or a parallel connection or a parallel-series connection to achieve a larger capacity or power. Since there may be a large number of battery cells included in each battery 10, the battery cells may be disposed in groups for ease of mounting, with each group of battery cells forming a battery module. The number of battery cells included in a battery module is unlimited and may be set according to the demand. The battery 10 may include a plurality of battery modules, and these battery modules may be connected in a series connection or a parallel connection or a parallel-series connection.

Optionally, the volume of the battery 10 may be 1/N of the volume of the battery compartment 20, and accordingly, the number of battery cells may be set according to the volume of the battery 10.

Accordingly, a plurality of batteries may be accommodated in the battery compartment 20. In the embodiments shown in FIGS. 3 and 4, 2 batteries may be accommodated within the battery compartment 20. In other embodiments, a greater or smaller number of batteries can be accommodated within the battery compartment 20 of the vehicle. In addition, the position of the battery compartment 20 varies for different types of vehicles. During the battery swapping process, the position of the vehicle on the battery swapping platform 200 is relatively fixed. Due to the movement of the mobile battery swapping apparatus along the guide rail, the guide rail limits the space in which the mobile battery swapping apparatus can be moved, thus resulting in the mobile battery swapping apparatus not being able to precisely match a wide variety of positions of the battery compartment 20.

Embodiments of the present application provide a battery swapping platform 200 and a battery swapping station 100. By fixing a first guide rail segment 211 of the guide rail 210 to a rotatable first platform 220 and fixing a second guide rail segment 212 of the guide rail 210 to a second platform 230, the second platform 230 is rotatable with the first platform 220, and the second platform 230 is driven by a translation drive assembly 240 to move in a direction perpendicular to the guide rail 210 relative to the first platform 220, so that the mobile battery swapping apparatus 108 can rotate on the battery swapping platform 200, translate along the guide rail 210, and translate perpendicular to the guide rail 210. Thus, the positions in which the mobile battery swapping apparatus 108 can stay on the battery swapping platform 200 can be more diverse, which is conducive to the mobile battery swapping apparatus 108 precisely matching a wide variety of positions of the battery compartment 20.

Figure 5:
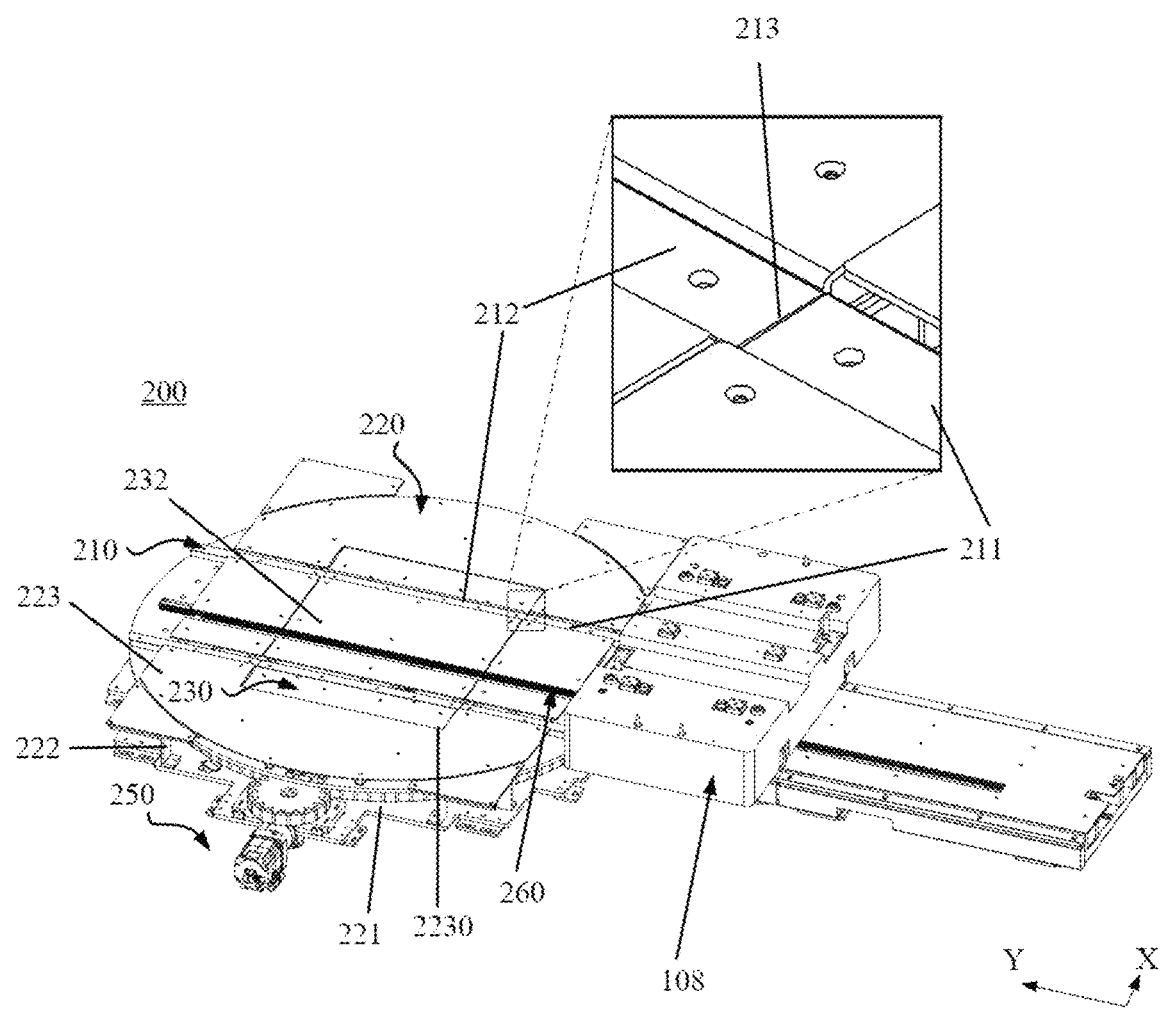
FIG. 5 is a schematic structural diagram of a battery swapping platform as disclosed in an embodiment of the present application.
Figure 6:
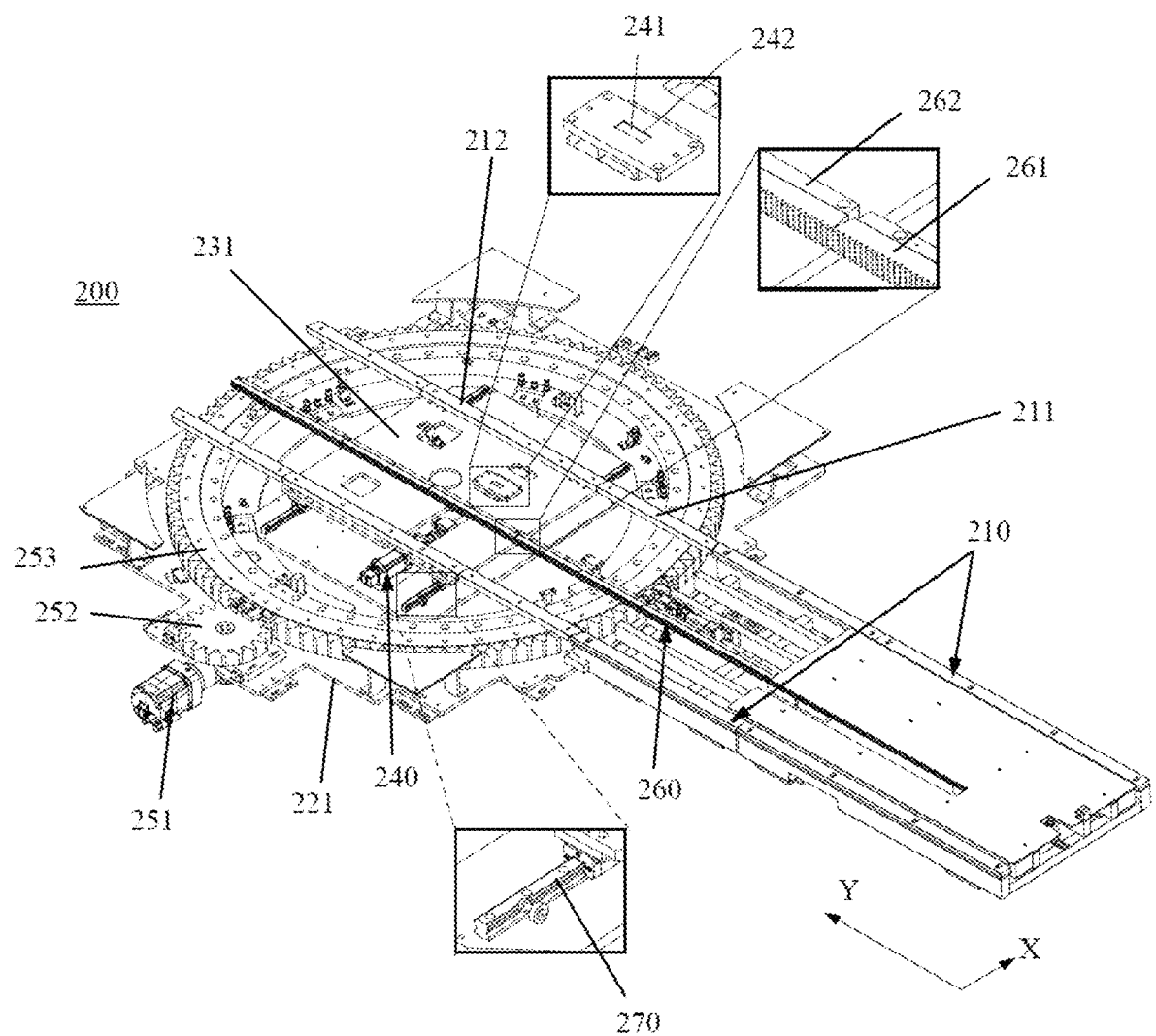
FIG. 6 is a schematic structural diagram of a battery swapping platform as disclosed in an embodiment of the present application.

FIGS. 5 and 6 are schematic structural diagrams of a battery swapping platform 200 provided in an embodiment of the present application. In some embodiments, the battery swapping platform 200 shown in FIGS. 5 and 6 may be applied, for example, to the battery swapping station 100 shown in FIG. 1. The battery swapping platform 200 may include a guide rail 210, a first platform 220, a second platform 230, and a translation drive assembly 240.

The guide rail 210 extends along the first direction Y. The guide rail 210 is used for moving the mobile battery swapping apparatus 108 along the first direction Y. The mobile battery swapping apparatus 108 is used for swapping the battery for the vehicle 1 shown in FIG. 2. The mobile battery swapping apparatus 108 can be moved along the guide rail 210. For example, the moving wheels of the mobile battery swapping apparatus 108 can be fitted with the guide rail 210. The direction of extension of the guide rail 210 may be the first direction Y. The first direction Y may be the direction of travel of the mobile battery swapping apparatus 108.

The guide rail 210 includes a first guide rail segment 211 and a second guide rail segment 212. The first guide rail segment 211 and the second guide rail segment 212 may be two separable guide rail segments 210 of the guide rail 210. The direction of extension of the first guide rail segment 211 and the direction of extension of the second guide rail segment 212 may be the first direction Y.

The first platform 220 is used for fixing the first guide rail segment 211. The first platform 220 is rotatable. In some embodiments, the first guide rail segment 211 can rotate following the first platform 220 as the first platform 220 is rotated.

The second platform 230 is used for fixing the second guide rail segment 212. The second platform 230 is provided on the first platform 220 and is rotatable with the first platform 220. In some embodiments, the second platform 230 and the second guide rail segment 212 can rotate following the first platform 220 as the first platform 220 is rotated.

When the mobile battery swapping apparatus 108 is fitted with the first guide rail segment 211 and the first platform 220 is rotated, the first guide rail segment 211 can rotate following the first platform 220 and thus the mobile battery swapping apparatus 108 is rotated.

When the mobile battery swapping apparatus 108 is fitted with the second guide rail segment 212 and the first platform 220 is rotated, as the second platform 230 can rotate following the first platform 220 and the second guide rail segment 212 can rotate following the second platform 230, the mobile battery swapping apparatus 108 can be rotated.

The translation drive assembly 240 is used for driving the second platform 230 to move along a second direction X relative to the first platform 220, so as to move the mobile battery swapping apparatus 108 along the second direction X, wherein the second direction X is perpendicular to the first direction Y. The second direction X may be parallel to the direction of travel of the vehicle 1 as shown in FIG. 2.

When the translation drive assembly 240 is not driving the second platform 230 to move, one end of the first guide rail segment 211 and one end of the second guide rail segment 212 may be disposed opposite to each other. The mobile battery swapping apparatus 108 is movable on the guide rail 210 along the first direction Y. In an embodiment, the mobile battery swapping apparatus 108 may travel from the first guide rail segment 211 to the second guide rail segment 212.

When the mobile battery swapping apparatus 108 is fitted with the second guide rail segment 212 and the translation drive assembly 240 moves the second platform 230 along the second direction X, the second guide rail segment 212 fixed on the second platform 230 can move along the second direction X following the second platform 230, so that the mobile battery swapping apparatus 108 can move along the second direction X. The first guide rail segment 211 fixed on the first platform 220 may be immobile as a whole relative to the battery swapping platform 200.

It should be understood that the battery swapping platform 200 may also include a greater number of guide rails 210. As shown in FIG. 5, the battery swapping platform 200 can move the mobile battery swapping apparatus 108 by means of 2 guide rails 210. An embodiment provided in the present application is illustrated with one guide rail 210 as an example. For an example of the battery swapping platform 200 with a plurality of guide rails 210, reference may be made to the embodiments provided in the present application.

Optionally, the second platform 230 is contained in the first platform 220, and the first platform 220 is provided with an open window 2230, the open window 2230 being used for exposing the second platform 230. That is, the second platform 230 may be housed within the cavity of the first platform 220; and the second guide rail segment 212 fixed on the second platform 230 may be fitted with the mobile battery swapping apparatus 108 through the open window 2230 of the first platform 220.

The first platform 220 may include a first mounting base 221, a bracket 222, and a first cover plate 223. The first cover plate 223 and the first mounting base 221 may be provided parallel to each other. The bracket 222 may be fixed on the first mounting base 221 and used for supporting the first cover plate 223 on the first mounting base 221. The space enclosed by the first mounting base 221, the bracket 222, and the first cover plate 223 may be used for housing part of the components of the battery swapping platform 200. The first cover plate 223 is provided with the open window 2230 thereon. The part of the components housed in the first platform 220 may be viewed through the open window 2230. The second platform 230 may be at least partially housed in the space enclosed by the first mounting base 221, the bracket 222, and the first cover plate 223 and be visible through the open window 2230 on the first cover plate 223. In other words, the second platform 230 may obscure the open window 2230 on the first cover plate 223 so that it is possible for components located within the first platform 220 not to expose the open window 2230.

In an embodiment, the second platform 230 as a whole may be disposed between the first mounting base 221 and the first cover plate 223, as shown in FIG. 5. The second platform 230 may include a second mounting base 231 and a second cover plate 232. The second cover plate 232 may be disposed on the second mounting base 231 by, for example, a fixing connector. Here, the second mounting base 231 may be fixed to the first platform 220, and located within the space enclosed by the first mounting base 221, the bracket 222, and the first cover plate 223. The second cover plate 232 may be located between the first cover plate 223 and the second mounting base 231. The second cover plate 232 may be disposed in parallel with respect to the first cover plate 223.

In another embodiment, a portion of the second platform 230 may be located between the first mounting base 221 and the first cover plate 223, and the other portion may protrude out of the open window 2230. For example, the fixing connector connecting the second cover plate 232 and the second mounting base 231 may pass through that open window 2230. The second cover plate 232 may be located on the side of the first cover plate 223 away from the first mounting base 221.

When the mobile battery swapping apparatus 108 moves to the first platform 220, the mobile battery swapping apparatus 108 may be fitted with the first guide rail segment 211 of the guide rail 210. When the mobile battery swapping apparatus 108 moves to the second platform 230, the mobile battery swapping apparatus 108 may be fitted with the second guide rail segment 212 of the guide rail 210.

In an embodiment, the first guide rail segment 211 may be fixed to the side of the first cover plate 223 away from the first mounting base 231. The second guide rail segment 212 may be fixed to the side of the second cover plate 232 away from the second mounting base 232.

In another embodiment, the guide rail 210 may be disposed below the first cover plate 223 and the second cover plate 232. Both the first cover plate 223 and the second cover plate 232 can provide mechanical protection for the guide rail 210, among other functions.

As shown in FIG. 5, the first cover plate 223 may include a first slit corresponding to the first guide rail segment 211. Through the first slit, the first guide rail segment 211 can be exposed out of the first cover plate 223. The first guide rail segment 211 or the mobile battery swapping apparatus 108 can pass through the first slit to enable the fitting of the first guide rail segment 211 with the mobile battery swapping apparatus 108. In an embodiment, the first guide rail segment 211 may be fixed to the first mounting base 221.

Similarly, the second cover plate 232 may include a second slit corresponding to the second guide rail segment 212. Through the second slit, the second guide rail segment 212 may be exposed out of the second cover plate 232. The second guide rail segment 212 or the mobile battery swapping apparatus 108 can pass through the second slit to enable the fitting of the second guide rail segment 212 with the mobile battery swapping apparatus 108. In an embodiment, the second guide rail segment 212 may be fixed to the second mounting base 231.

In some embodiments, in order to reduce bumps of the mobile battery swapping apparatus 108, the surface of the first guide rail segment 211 near the vehicle may be flush with the surface of the second guide rail segment 212 near the vehicle.

Optionally, there is a first broken seam 213 between the first guide rail segment 211 and the second guide rail segment 212, wherein the broken seam 213 corresponds to an edge of the open window 2230 to allow the second guide rail segment 212 and the second platform 230 to move along the second direction X. That is, by providing the first broken seam 213 on the guide rail 210, the guide rail 210 can be divided into the first guide rail segment 211 and the second guide rail segment 212, wherein the first guide rail segment 211 and the second guide rail segment 212 can be located on the two sides of the first broken seam 213, respectively.

When the translation drive assembly 240 is not driving the second platform 230 to move, one end of the first guide rail segment 211 and one end of the second guide rail segment 212 may be disposed opposite to each other. In order to reduce interference between the first guide rail segment 211 and the second guide rail segment 212 due to vibrations of the entire machine and other reasons, there may exist the first broken seam 213 between the first guide rail segment 211 and the second guide rail segment 212. In the embodiment provided in the present application, the broken seam may also be referred to as a gap, slit, etc. The width of this first broken seam 213 should not be too large, so as to facilitate the reduction of the degree of bumping of the mobile battery swapping apparatus 108 at the first broken seam 213.

After the translation drive assembly 240 drives the second platform 230 to move, the second guide rail segment 212 may be gradually moved away from the first guide rail segment 211 since the first guide rail segment 211 and the second guide rail segment 212 are not connected. The first guide rail segment 211 and the second guide rail segment 212 may be separated. In addition, by driving the second platform 230 by the translation drive assembly 240, the second guide rail segment 212 may also be moved back to the vicinity of the first guide rail segment 211.

The first broken seam 213 corresponds to the edge of the open window 2230, which may mean that the distance from the first broken seam 213 to the edge of the open window 2230 is small. The first broken seam 213 may be located, for example, within the area enclosed by the open window 2230, or be located outside the area enclosed by the open window 2230. In an embodiment, the width of the open window 2230 in the direction of extension of the second guide rail segment 212 may be close to the length of the second guide rail segment 212. Since the first broken seam 213 corresponds to the edge of the open window 2230, when the mobile battery swapping apparatus 108 as a whole is located on the second platform 230, the mobile battery swapping apparatus 108 can be mated only with the second guide rail segment 212 and not with the first guide rail segment 211. Thus, the space in which the mobile battery swapping apparatus 108 can be moved in the direction perpendicular to the guide rail 210 may correspond to the area enclosed by the open window 2230.

Optionally, the space in which the second guide rail segment 212 can be moved along the second direction X is located within the open window 2230. Since the second guide rail segment 212 is located within the area enclosed by the open window 2230, the second guide rail segment 212 may not be moved out of the open window 2230. Thus, the open window 2230 may limit the space in which the second guide rail segment 212 can be moved in the direction perpendicular to the guide rail 210.

Figure 7:
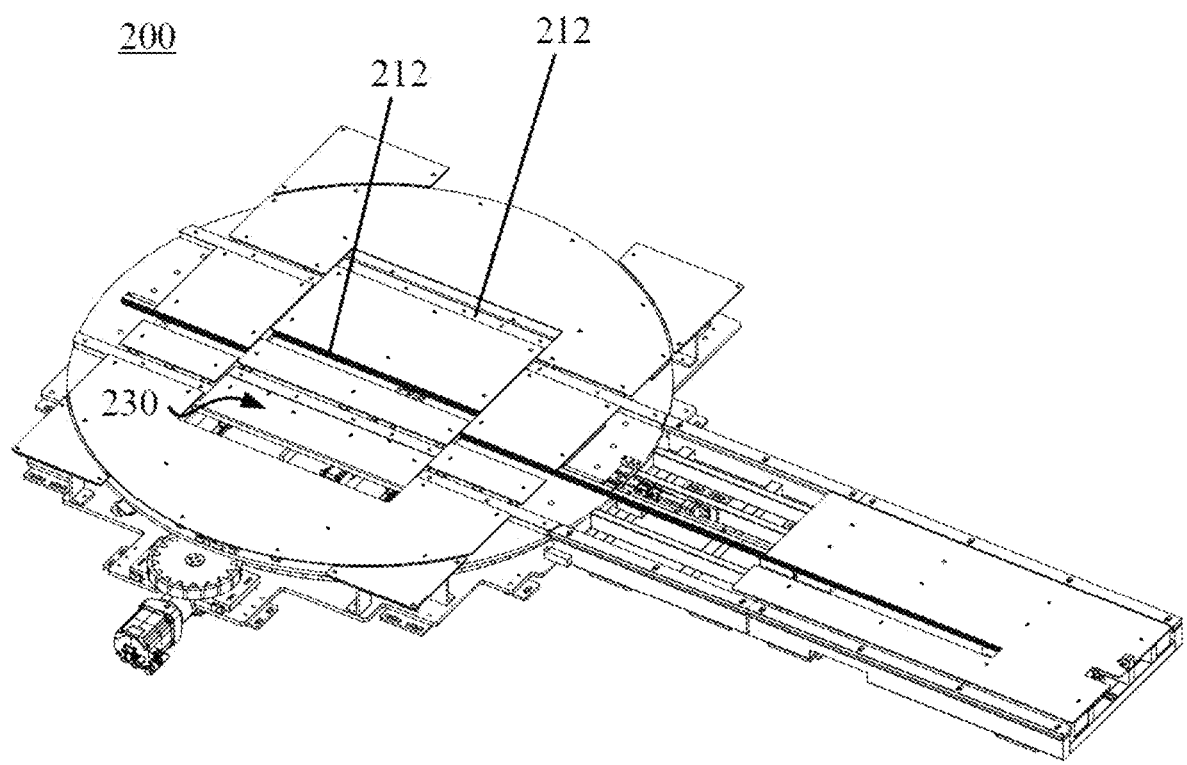
FIG. 7 is a schematic structural diagram of a battery swapping platform as disclosed in an embodiment of the present application.

FIG. 7 illustrates a schematic structural diagram of the battery swapping platform 100 after the translation drive assembly 240 moves the second platform 230. As shown in FIG. 7, In an embodiment, after the second platform 230 is moved relative to the first platform 220, the second cover plate 232 can obscure a portion of the open window 2230. In other embodiments, after the second platform 230 is moved relative to the first platform 220, the second cover plate 232 can still obscure the entire open window 2230.

Optionally, the battery swapping platform 200 further includes a rack 260. The rack 260 extends along the first direction Y. That is, the direction of extension of the rack 260 may be consistent with the direction of extension of the guide rail 210. The mobile battery swapping apparatus 108 may be provided with a gear (not shown in FIG. 5) that engages with the rack 260. The mobile battery swapping apparatus 108 can drive the gear to rotate, and through the engagement relationship between the rack 260 and the gear, the mobile battery swapping apparatus 108 can be moved in the direction of extension of the rack 260.

The rack 260 includes a first rack segment 261 and a second rack segment 262, the first rack segment 261 being fixed to the first platform 220 and the second rack segment 262 being fixed to the second platform 230.

In some embodiments, the first rack segment 261 and the second rack segment 262 can rotate following the first platform 220 as the first platform 220 is rotated.

When the gear of the mobile battery swapping apparatus 108 is engaged with the first rack segment 261 and the first platform 220 is rotated, the first rack segment 261 can rotate following the first platform 220 and thus the mobile battery swapping apparatus 108 is rotated.

When the gear of the mobile battery swapping apparatus 108 is engaged with the second rack segment 262 and the first platform 220 is rotated, as the second platform 230 can rotate following the first platform 220 and the second rack segment 262 can rotate following the second platform 230, the mobile battery swapping apparatus 108 can be rotated.

When the translation drive assembly 240 is not driving the second platform 230 to move, one end of the first rack segment 261 and one end of the second rack segment 262 may be disposed opposite to each other. The gear of the mobile battery swapping apparatus 108 may be engaged with the rack 260 to enable the mobile battery swapping apparatus 108 to move along the first direction Y. In an embodiment, the mobile battery swapping apparatus 108 may travel from the first rack segment 261 to the second rack segment 262.

When the gear of the mobile battery swapping apparatus 108 is engaged with the second rack segment 262 and the translation drive assembly 240 moves the second platform 230 along the second direction X, the second rack segment 262 fixed on the second platform 230 can move along the second direction X following the second platform 230, so that the mobile battery swapping apparatus 108 and the second rack segment 262 can move along the second direction X synchronously. The first rack segment 261 fixed on the first platform 220 may be immobile as a whole relative to the battery swapping platform 200.

When the mobile battery swapping apparatus 108 moves to the first platform 220, the gear of the mobile battery swapping apparatus 108 can be engaged with the first rack segment 261. When the mobile battery swapping apparatus 108 moves to the second platform 230, the gear of the mobile battery swapping apparatus 108 can be engaged with the second rack segment 262.

In an embodiment, the first rack segment 261 can be fixed to the first cover plate 223 of the first platform 220, for example, on the side of the first cover plate 223 away from the first mounting base 221. The second rack segment 262 can be fixed to the second cover plate 232 of the second platform 230, for example, on the side of the second cover plate 232 away from the second mounting base 231.

In another embodiment, the rack 260 may be disposed below the first cover plate 223 and the second cover plate 232, and both the first cover plate 223 and the second cover plate 232 can provide mechanical protection for the rack 260, among other functions.

As shown in FIG. 5, the first cover plate 223 may include a third slit corresponding to the first rack segment 261. Through the third slit, the first rack segment 261 can be exposed out of the first cover plate 223. The first rack segment 261 or the gear of the mobile battery swapping apparatus 108 can pass through the third slit to enable the engagement of the first rack segment 261 and the gear of the mobile battery swapping apparatus 108. In an embodiment, the first rack segment 261 can be fixed to the first mounting base 221.

Similarly, the second cover plate 232 may include a fourth slit corresponding to the second rack segment 262. Through the fourth slit, the second rack segment 262 may be exposed out of the second cover plate 232. The second rack segment 262 or the gear of the mobile battery swapping apparatus 108 can pass through the fourth slit to enable the engagement of the second rack segment 262 and the gear of the mobile battery swapping apparatus 108. In an embodiment, the second rack segment 262 can be fixed to the second mounting base 231.

In some embodiments, in order to reduce bumps of the mobile battery swapping apparatus 108, the tooth surface of the first rack segment 261 may have a smooth transition with the tooth surface of the second rack segment 262.

Optionally, there is a second broken seam between the first rack segment 261 and the second rack segment 262, wherein the second broken seam corresponds to the edge of the open window 2230 to allow the second rack segment 262 and the second platform 230 to move along the second direction X. That is, by providing the second broken seam on the rack 260, the rack 260 can be divided into the first rack segment 261 and the second rack segment 262, wherein the first rack segment 261 and the second rack segment 262 are located on the two side of the second broken seam, respectively.

When the translation drive assembly 240 is not driving the second platform 230 to move, one end of the first rack segment 261 and one end of the second rack segment 262 may be disposed opposite to each other. In order to reduce interference between the first rack segment 261 and the second rack segment 262 due to vibrations of the entire machine and other reasons, there may exist the second broken seam between the first rack segment 261 and the second rack segment 262. The width of this second broken seam should not be too large, so as to facilitate the reduction of the length of time that the gear of the mobile battery swapping apparatus 108 is disengaged from the rack 260 during the movement of the mobile battery swapping apparatus 108.

After the translation drive assembly 240 drives the second platform 230 to move, the second rack segment 262 may be gradually moved away from the first rack segment 261 since the first rack segment 261 and the second rack segment 262 are not connected. The first rack segment 261 and the second rack segment 262 may be separated. In addition, by driving the second platform 230 by the translation drive assembly 240, the second rack segment 262 may also be moved back to the vicinity of the first rack segment 261.

The second broken seam corresponds to the edge of the open window 2230, which may mean that the distance from the second broken seam to the edge of the open window 2230 is small. The second broken seam may be located, for example, within the area enclosed by the open window 2230, or be located outside the area enclosed by the open window 2230. In an embodiment, the width of the open window 2230 in the direction of extension of the second rack segment 262 may be close to the length of the second rack segment 262. Since the second broken seam corresponds to the edge of the open window 2230, when the mobile battery swapping apparatus 108 as a whole is located on the second platform 230, the gear of the mobile battery swapping apparatus 108 can be engaged only with the second rack segment 262 and not with the first rack segment 261. Thus, the space in which the mobile battery swapping apparatus 108 can move along the direction perpendicular to the rack 260 may correspond to the area enclosed by the open window 2230.

Optionally, the movement space for the second rack segment 262 in the second direction X is within the open window 2230. Since the second rack segment 262 is located within the area enclosed by the open window 2230, the second rack segment 262 may not be moved out of the open window 2230. Thus, the open window 2230 may limit the movement space for the second rack segment 262 in the direction perpendicular to the rack 260.

It should be understood that the battery swapping platform 200 may also include a greater number of racks 260. An embodiment provided in the present application is illustrated with one rack 260 as an example. For an example of the battery swapping platform 200 with a plurality of racks 260, reference may be made to the embodiments provided in the present application.

Figure 8:
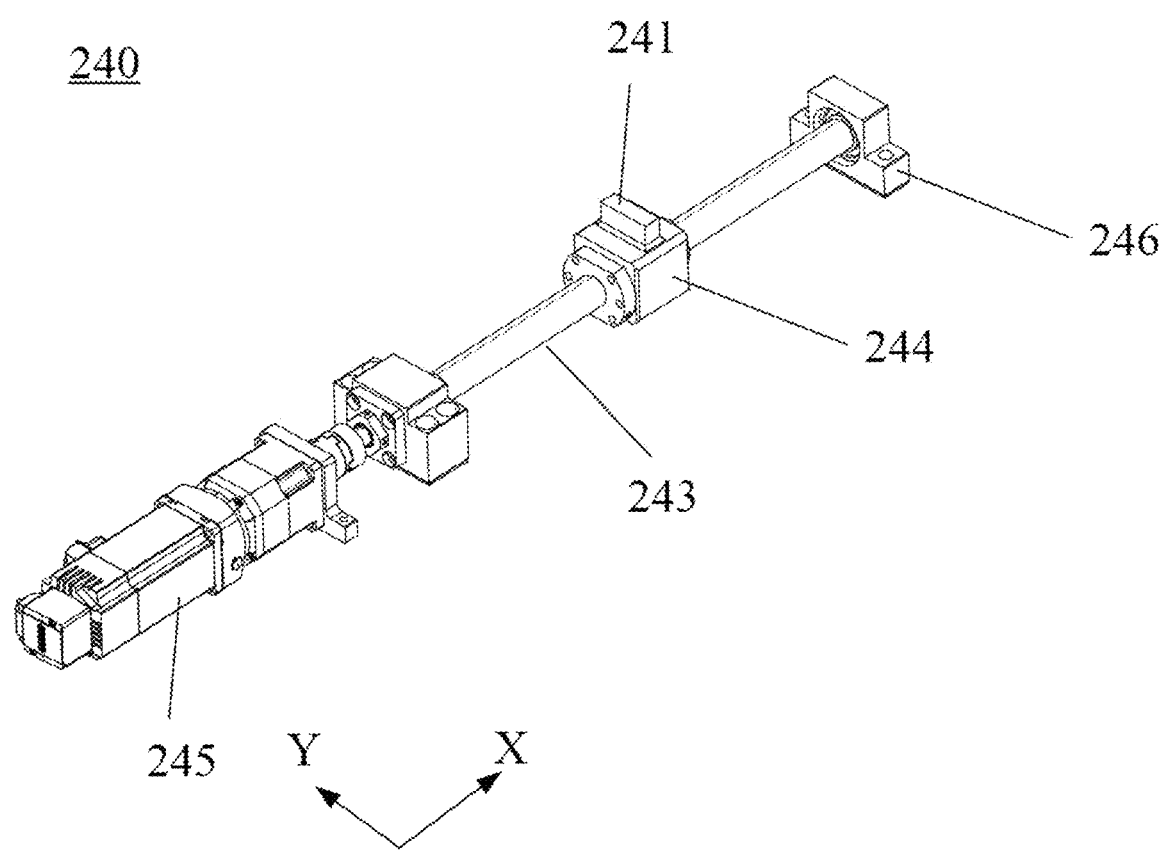
FIG. 8 is a schematic structural diagram of a translation drive assembly as disclosed in an embodiment of the present application.

Optionally, as shown in FIGS. 6 and 8, the translation drive assembly 240 includes a first fixing member or structure, wherein the first fixing member is used for fixedly connecting to the second platform 230, and the first fixing member is configured to move along the second direction X so as to drive the mobile battery swapping apparatus 108 to move along the second direction X. That is, the first fixing member may be fixedly connected to the second platform 230, and by driving the first fixing member to move along the second direction, the translation drive assembly 240 drives the second platform 230 to move along the second direction X. Since the second guide rail segment 212 can move following the second platform 230 along the second direction X, the mobile battery swapping apparatus 108 fitted with the second guide rail segment 212 can move along the second direction X.

Optionally, the second platform 230 is provided with a clamping slot 242, and the first fixing member is a boss 241 fitted with the clamping slot 242. The clamping slot 242 may be a through slot or a blind slot. That is, the boss 241 of the translation drive assembly 240 may extend into the clamping slot 242 of the second platform 230 and be in clamping connection with the clamping slot 242. In some embodiments, the boss 241 and the clamping slot 242 may be fixed to each other by means of adhesive or the like. The fixed connection relationship between the translation drive assembly 240 and the second platform 230 may be implemented by means of fitting between the clamping slot 242 and the boss 241. The fixed connection relationship between the translation drive assembly 240 and the second platform 230 can be released by taking the boss 241 out of the clamping slot 242.

Optionally, the translation drive assembly 240 further comprises a lead screw 243, a transmission nut 244, and a first motor 245, wherein the lead screw 243 extends along the second direction X, and the transmission nut 244 is in transmission fit with the lead screw 243; and the transmission nut 244 is connected to the first fixing member, and the first motor 245 is used for driving the lead screw 243 to rotate so as to drive the transmission nut to move relative to the lead screw 243.

FIG. 8 illustrates a schematic structural diagram of a translation drive assembly 240 provided by an embodiment of the present application. The first motor 245 can drive the lead screw 243 to rotate. The transmission nut 244 can move along the direction of extension of the lead screw 243 by means of the fitting of the lead screw 243 and the transmission nut 244. Since the lead screw 243 extends along the second direction X, the transmission nut 244 can move along the second direction X. Also because the transmission nut 244 is connected to the first fixing member, the first fixing member can move along the second direction X, so as to drive the second platform 230 to move along the second direction X.

In some embodiments, the translation drive assembly 240 may be fixed to the first mounting base 221 of the first platform 220. For example, in conjunction with FIGS. 6 and 8, the first motor 245 may be fixed to the first mounting base 221 of the first platform 220. One end of the lead screw 243 may be connected to the first motor 245, and the other end of the lead screw 243 may pass through a lead screw support 246, wherein the lead screw support 246 may be fixed to the first mounting base 221. The first fixing member may be fixed to the side of the transmission nut 244 near the second mounting base 231.

In an embodiment, as shown in FIG. 6, the second mounting base 231 may include an opening provided opposite the first motor 245. The first motor 245 may pass through this opening. The height of the first motor 245 may be relatively great, and by providing an opening on the second mounting base 231 opposite to the first motor 245, it is conducive to reducing the space occupied by the first motor 245 and the second mounting base 231 as a whole in the height direction. In addition, since the second mounting base 231 can move along the second direction X, by providing an opening on the second mounting base 231 corresponding to the first motor 245, it is conducive to reducing the possibility of interference between the second mounting base 231 and the first motor 245.

Optionally, a rail 270 extending along the second direction X is fixed on the first platform 220, and the second platform 230 is configured to move on the rail 270. That is, the rail 270 can be used to limit the movement of the second platform 230 along the second direction X. In an embodiment, the rail 270 may be fixed to the first mounting base 221 of the first platform 220 and located between the first mounting base 221 and the second mounting base 231 of the second platform 230. The side of the second mounting base 231 near the first mounting base 221 may be provided with a moving member fitted with the rail 270 to allow the second platform 230 to move on the rail 270. By means of the rail 270, the second platform 230 can move with a relatively small degree of deviation from a preset direction, where this predetermined direction may be perpendicular to the direction of extension of the guide rail 210.

Optionally, the battery swapping platform 200 further includes a rotation drive assembly. The rotation drive assembly 250 is used for driving the first platform 220 and the second platform 230 to rotate as a whole. In other words, by means of the rotation drive assembly 250 and the translation drive assembly 240, the battery swapping platform 200 can implement rotation of the first platform 220 and the second platform 230 and translation of the second platform 230, respectively.

Optionally, the second platform 230 is provided in a central area of the first platform 220, and the rotation drive assembly 250 is used for driving the first platform 220 and the second platform 230 to rotate around the center of the first platform 220. After the mobile battery swapping apparatus 108 moves to the second platform 230, the rotation drive assembly 250 can rotate the first platform 220 so that the mobile battery swapping apparatus 108 can rotate relative to the center of the first platform 220. Since the second platform 230 is located in the central region of the first platform 220, the mobile battery swapping apparatus 108 can rotate along the center of the second platform 230. In an embodiment, when the mobile battery swapping apparatus 108 is located in the central area of the second platform 230, the rotation drive assembly 250 can drive the first platform 220 and the second platform 230 to rotate around the center of the first platform 220.

Optionally, the rotation drive assembly 250 includes a second fixing member or structure, wherein the second fixing member is used for fixedly connecting the first platform 220, and the second fixing member is driven to rotate so as to drive the first platform 220 and the second platform 230 to rotate as a whole. That is, since the second fixing member may be fixedly connected to the first platform 220, by driving the second fixing member to rotate, the rotation drive assembly 250 drives the first platform 220 to rotate. Since the second platform 230 can rotate following the first platform 220, the mobile battery swapping apparatus 108 fitted with the second guide rail segment 212 can be rotated.

Optionally, the second fixing member is a first gear 253, and the rotation drive assembly 250 further comprises a second gear 252 and a second motor 251, wherein the first gear 253 is engaged with the second gear 252, and the second motor 251 is used for driving the second gear 252 to rotate so as to drive the first gear 253 to rotate. That is, the second motor 251 can drive the second gear 252 to rotate. By means of engagement of the second gear 252 with the first gear 253, the first gear 253 can rotate around the center of the first gear 253 itself. Since the first gear 253 is fixedly connected to the first platform 220, the first platform 220 can rotate following the first gear 253. In an embodiment, the center of the first gear 253 can be aligned with the center of the first platform 220. In an embodiment, the first gear 253 can be fixed to the first mounting base 221 of the first platform 220.

In some embodiments, a portion of the rotation drive assembly 250 may be contained in the first platform 220 and the other portion may be located outside of the first platform 220. For example, as shown in FIG. 6, the first gear 253 is contained in the cavity formed by the first mounting base 221, the bracket 222, and the first cover plate 223. The second gear 252 may partially protrude out of the cavity formed by the first mounting base 221, the bracket 222, and the first cover plate 223, and the second motor 251 may be located outside the cavity formed by the first mounting base 221, the bracket 222, and the first cover plate 223.

Optionally, the first gear 253 is a gear ring surrounding the translation drive assembly 240, and the translation drive assembly 240 is used for moving the second platform 230 within the area enclosed by the first gear 253. That is, the translation drive assembly 240 may be located within the area enclosed by the first gear 253. Accordingly, the second platform 230 may be moved within the area enclosed by the first gear 253. In an embodiment, the rail 270 that is fitted with the second platform 230 as the second platform 230 moves may be located within the area enclosed by the first gear 253.

A plurality of possible application scenarios for the solutions provided by Embodiments of the present application will be described below in conjunction with the embodiments shown in FIGS. 1 through 8.

In some embodiments, as shown in FIGS. 3 and 4, the battery 10 may be in an elongated shape. A plurality of batteries 10 may be provided in the battery compartment 20 of the vehicle 1. The direction of the long side of the battery 10 may be perpendicular to the direction of travel X of the vehicle 1. The direction of arrangement of the batteries 10 in the battery compartment 20 may be along the direction of travel X of the vehicle 1.

When the vehicle 1 travels to the battery swapping platform 200, the mobile battery swapping apparatus 108 can move to a position below the battery compartment 20 of the vehicle 1 along the direction of extension Y of the guide rail, where the direction of extension Y of the guide rail may be perpendicular to the direction of travel X of the vehicle 1

In a possible scenario, the direction of the long side of the battery 10 carried by the mobile battery swapping apparatus 108 may be parallel to the direction of extension Y of the guide rail. In this case, the mobile battery swapping apparatus 108 needs to move along the direction perpendicular to the guide rail in addition to the direction of extension Y of the guide rail, so that the mobile battery swapping apparatus 108 can mount the plurality of batteries 10 that are arranged along the direction of travel X of the vehicle 1.

According to the embodiment provided above, the mobile battery swapping apparatus 108 can move on the first platform or the second platform along the direction of extension Y of the guide rail; the second platform can be driven by the translation drive assembly to move along the direction perpendicular to the guide rail so that the mobile battery swapping apparatus 108 can move along the direction of travel X of the vehicle 1 to mount the plurality of batteries 10 into the battery compartment 20 of the vehicle 1.

In another possible scenario, the direction of the long side of the battery 10 carried by the mobile battery swapping apparatus 108 may be perpendicular to the direction of extension Y of the guide rail. In this case, the mobile battery swapping apparatus 108 needs to be rotated by 90° so that the direction of the long side of the battery 10 carried by the mobile battery swapping apparatus 108 can be perpendicular to the direction of travel X of the vehicle 1.

After the mobile battery swapping apparatus 108 is rotated by 90°, the guide rail fitted with the mobile battery swapping apparatus 108 may be rotated so that the direction of extension of the rotated guide rail may be parallel to the direction of travel X of the vehicle 1. The mobile battery swapping apparatus 108 can move on the guide rail along the direction of travel X of the vehicle 1. Thereby, the mobile battery swapping apparatus 108 can mount the plurality of batteries 10 into the battery compartment 20 of the vehicle 1.

In some other embodiments, the batteries 10 may be in an elongated shape. A plurality of batteries 10 may be provided in the battery compartment 20 of the vehicle 1. The direction of the long side of the battery 10 may be parallel to the direction of travel X of the vehicle 1. The direction of arrangement of the batteries 10 in the battery compartment 20 may be perpendicular to the direction of travel X of the vehicle 1.

When the vehicle 1 travels to the battery swapping platform 200, the mobile battery swapping apparatus 108 can move to a position below the battery compartment 20 of the vehicle 1 along the direction of extension Y of the guide rail, where the direction of extension Y of the guide rail may be perpendicular to the direction of travel X of the vehicle 1

In a possible scenario, the direction of the long side of the battery 10 carried by the mobile battery swapping apparatus 108 may be parallel to the direction of extension Y of the guide rail. In this case, the mobile battery swapping apparatus 108 needs to be rotated by 90° so that the direction of the long side of the battery 10 carried by the mobile battery swapping apparatus 108 can be parallel to the direction of travel X of the vehicle 1.

After the mobile battery swapping apparatus 108 is rotated by 90°, the guide rail fitted with the mobile battery swapping apparatus 108 may be rotated so that the direction of extension of the rotated guide rail may be parallel to the direction of travel X of the vehicle 1. Since the batteries 10 are arranged in the battery compartment 20 perpendicular to the direction of travel X of the vehicle 1, the mobile battery swapping apparatus 108 also needs to move perpendicular to the direction of travel X of the vehicle 1.

According to the embodiment provided above, the second platform can be driven by the translation drive assembly to move along the direction perpendicular to the guide rail so that the mobile battery swapping apparatus 108 can move perpendicular to the direction of travel X of the vehicle 1 to mount the plurality of batteries 10 into the battery compartment 20 of the vehicle 1.

In another possible scenario, the direction of the long side of the battery 10 carried by the mobile battery swapping apparatus 108 may be perpendicular to the direction of extension Y of the guide rail, i.e., parallel to the direction of travel X of the vehicle 1. In this case, the mobile battery swapping apparatus 108 move along the direction of extension Y of the guide rail, so that the mobile battery swapping apparatus 108 can mount the plurality of batteries 10 that are arranged perpendicular to the direction of travel X of the vehicle 1.

Although the present application has been described with reference to the preferred embodiments, various improvements can be made thereto and components thereof can be replaced with equivalents without departing from the scope of the present application. In particular, the various technical features mentioned in each embodiment can be combined in any manner, provided that there is no structural conflict. The present application is not limited to the particular embodiments disclosed in the text, but includes all technical solutions that fall within the scope of the claims.

The invention claimed is:

1. A battery swapping platform, comprising:
   a guide rail extending along a first direction, wherein the guide rail is used for moving a mobile battery swapping apparatus along the first direction, the mobile battery swapping apparatus being used for swapping a battery for a vehicle, and the guide rail comprises a first guide rail segment and a second guide rail segment;
   a first platform for fixing the first guide rail segment, wherein the first platform is rotatable;
   a second platform for fixing the second guide rail segment, wherein the second platform is provided on the first platform and is rotatable with the first platform; and
   a translation drive assembly for driving the second platform to move along a second direction relative to the first platform, so as to move the mobile battery swapping apparatus along the second direction, wherein the second direction is perpendicular to the first direction.

2. The battery swapping platform according to claim 1, wherein the second platform is contained in the first platform, and the first platform is provided with an open window, the open window being used for exposing the second platform.

3. The battery swapping platform according to claim 2, wherein there is a broken seam between the first guide rail segment and the second guide rail segment, and the broken seam corresponds to an edge of the open window to allow the second guide rail segment and the second platform to move along the second direction.

4. The battery swapping platform according to claim 2, wherein the movement space for the second guide rail segment in the second direction is within the open window.

5. The battery swapping platform according to claim 1, wherein the battery swapping platform further comprises:
   a rack extending along the first direction, wherein the rack comprises a first rack segment and a second rack segment, the first rack segment being fixed to the first platform and the second rack segment being fixed to the second platform.

6. The battery swapping platform according to claim 1, wherein the translation drive assembly comprises a first fixing structure, the first fixing structure is fixedly connected to the second platform, and the first fixing structure is configured to move along the second direction so as to drive the mobile battery swapping apparatus to move along the second direction.

7. The battery swapping platform according to claim 6, wherein the second platform is provided with a clamping slot, and the first fixing structure is a boss fitted with the clamping slot.

8. The battery swapping platform according to claim 6, wherein the translation drive assembly further comprises a lead screw, a transmission nut, and a first motor, wherein the lead screw extends along the second direction, and the transmission nut is in transmission fit with the lead screw; the transmission nut is connected to the first fixing structure, and the first motor is used for driving the lead screw to rotate so as to drive the transmission nut to move relative to the lead screw.

9. The battery swapping platform according to claim 1, wherein a rail extending along the second direction is fixed on the first platform, and the second platform is configured to move on the rail.

10. The battery swapping platform according to claim 1, wherein the battery swapping platform further comprises:
   a rotation drive assembly, wherein the rotation drive assembly is used for driving the first platform and the second platform to rotate as a whole.

11. The battery swapping platform according to claim 10, wherein the second platform is provided in a central area of the first platform, and the rotation drive assembly is used for driving the first platform and the second platform to rotate around the center of the first platform.

12. The battery swapping platform according to claim 10, wherein the rotation drive assembly comprises a second fixing structure, the second fixing structure is used for fixedly connecting the first platform, and the second fixing structure is driven to rotate so as to drive the first platform and the second platform to rotate as a whole.

13. The battery swapping platform according to claim 12, wherein the second fixing structure is a first gear, the rotation drive assembly further comprises a second gear and a second motor, the first gear is engaged with the second gear, and the second motor is used for driving the second gear to rotate so as to drive the first gear to rotate.

14. The battery swapping platform according to claim 13, wherein the first gear is a gear ring surrounding the translation drive assembly, and the translation drive assembly is used for moving the second platform within an area enclosed by the first gear.

15. A battery swapping station, comprising: a battery rack, a mobile battery swapping apparatus, and the battery swapping platform of claim 1, wherein the battery rack is configured with a plurality of batteries, and the mobile battery swapping apparatus is used to transport a battery on the battery rack to the battery swapping platform, and move on the battery swapping platform along the first direction and/or the second direction so as to swap the battery to the vehicle.

* * * * *